Feb. 23, 1926.

S. ANDERSEN 1,574,543

HEADLIGHT CONSTRUCTION

Filed Jan. 19, 1925

Inventor
S. Andersen

By Clarence O'Brien
Attorney

Patented Feb. 23, 1926.

1,574,543

UNITED STATES PATENT OFFICE.

SIMONI ANDERSEN, OF DEAVER, WYOMING.

HEADLIGHT CONSTRUCTION.

Application filed January 19, 1925. Serial No. 3,370.

*To all whom it may concern:*

Be it known that I, SIMONI ANDERSEN, citizen of the United States, residing at Deaver, in the county of Big Horn and State of Wyoming, have invented certain new and useful Improvements in a Headlight Construction, of which the following is a specification.

This invention relates to improvements in automobile headlights and has for its principal object to provide means for preventing the blinding of the operators of approaching vehicles by the light rays of the headlights, further eliminating the objectionable and confusing glare without appreciably lessening the illumination of the road.

A further object of the invention is to provide an automobile headlight construction of the above mentioned character, wherein a deflector is arranged within the headlight for dividing the same into two compartments, a lamp being provided for illuminating both of the compartments, and a principal lamp being provided for use in conjunction only with the lower compartment whereby the light rays will be directed downwardly onto the road when the lower lamp is illuminated and preventing the rays of light from being directed upwardly and causing any unnecessary glare and confusion.

A further object is to provide an automobile headlight construction of the above mentioned character, which is simple in construction, inexpensive, strong and durable, and furthermore adapted for the purposes for which it is designated.

Other objects and advantages of this invention will become apparent during the course of the following description.

Figure 1:
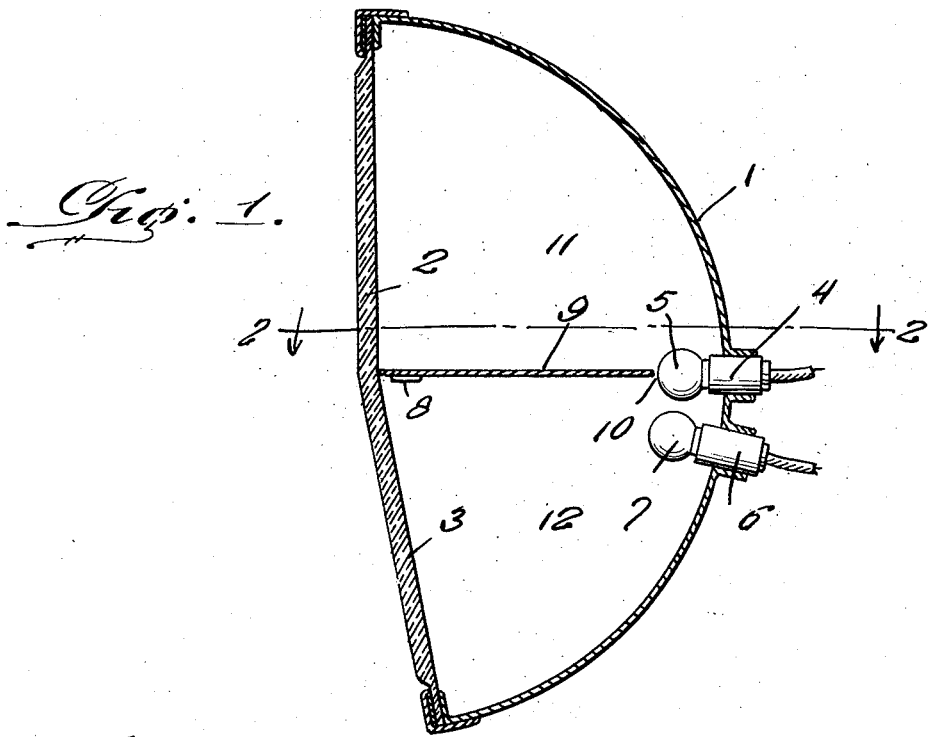
Figure 2:
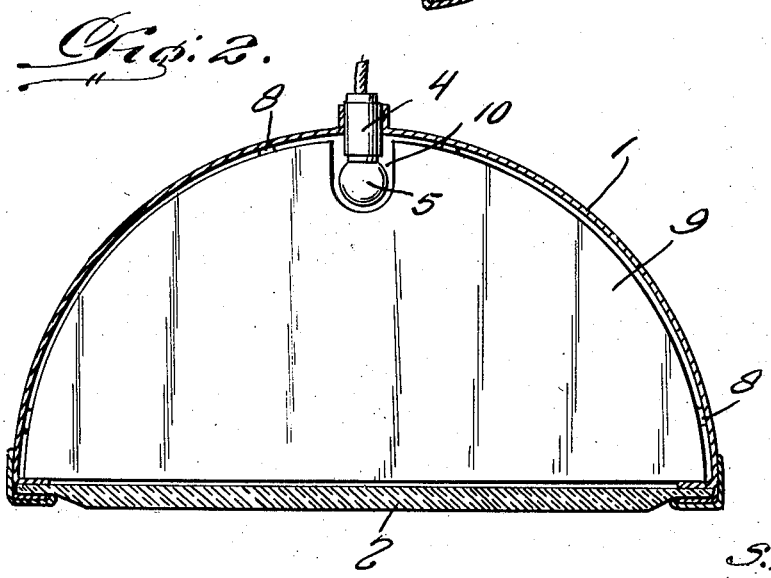

In the accompanying drawing forming part of this specification and in which like numerals designate like parts throughout the same:

Figure 1 is a vertical sectional view through the headlight embodying my invention, and Fig. 2 is a transverse section taken approximately the line 2—2, of Fig. 1.

In the drawings wherein for the purpose of illustration is shown the preferred embodiment of my invention, the numeral 1 designates a substantially semi-circular casing, the same being open at its front, the lower half of the casing having its forward edge gradually converging toward the bottom as clearly illustrated in Fig. 1 for the purpose hereinafter to be more fully described.

A lens 2 is immovably supported in the open front of the casing and the lower portion thereof is offset at an angle as illustrated at 3 to cooperate with the lower half of the forward edge of the casing.

A lamp socket 4 of any well known construction is supported in the central portion of the rear end of the casing, the same being adapted to receive the lamp 5. A similar lamp socket 6 is supported in the rear portion of the casing and at a point directly below the lamp socket 4, and is disposed at an angle. The last mentioned lamp socket receives the lamp 7 and the arrangement of the lamp is clearly set forth in Fig. 1.

Horizontally within the casing 1, in the central portion thereof, are the lugs 8 which support the substantially semi-circular partition 9, the same being of such shape as to conform with the configuration of the inner wall of the casing 1. The central rear portion of the partition 9 which is in the form of a metallic plate is cut out as illustrated at 10 and the purpose of this construction is to permit the lamp 5 to be disposed centrally in the cut out portion. The provision of the partition 9 forms an upper and a lower compartment 11 and 12 respectively within the casing 1. The opposed faces of the partition 9 are coated with the usual material for providing reflector surfaces and the inner wall of the casing is also coated to provide a reflecting surface.

When the lamp 5 is illuminated, the rays of light therefrom will be equally distributed within the upper and lower compartments 11 and 12 and the rays of light will be directed outwardly through the upper and lower portions of the lens 2, thus giving a relatively large beam of light which projects forwardly of the automobile for a considerable distance. When the automobile upon which the headlight the construction of which has heretofore been more fully described, is about to pass an approaching vehicle, the upper lamp 5 is extinguished and the lower lamp 7 is turned on. The rays of light from the lower lamp 7 will be deflected downwardly onto the road by reason of the provision of the partition 9 and furthermore by having the lower half of the lens offset in an angle, the rays of light will be directed immediately forwardly of the automobile onto the road thus preventing the blinding of the driver of the approaching vehicle from the glare of the headlights, but at the same time permitting the roadway to be sufficiently illuminated so as to enable the operator of the automobile upon which the headlight is mounted to readily have a full view of the road.

Furthermore the deflector 9 will prevent the rays of light from the lamp 7 from being projected upwardly into the compartment 11 and out through the upper half of the lens 2.

While I have shown the preferred embodiment of my invention, it is to be understood that various changes in the size, shape and arrangement of parts may be resorted to without departing from the spirit of the invention and the scope of the appended claim.

Having thus described the invention, what I claim as new is:—

An automobile headlight comprising a substantially semi-circular casing open at its front, the forward edges of the lower half of the casing being cut away, a lens mounted in the open portion of the casing, the lower half thereof being offset at an angle to correspond with the cut away forward edges of the lower half of the casing, a lamp arranged centrally in the rear portion of the casing, an additional lamp supported below the aforementioned lamp, a partition supported horizontally in the central portion of the casing and conforming with the shape of the interior of the casing, the rear central portion of the partition being cut out to receive the first mentioned lamp, the opposed faces of the partition and the inner wall of the casing providing reflecting surfaces, the rays of light from the first mentioned lamp adapted to be disposed outwardly through the lens on opposite sides of the partition, the rays of light from the lower lamp being adapted to be disposed outwardly through the lower angular offset portion of the lens.

In testimony whereof I affix my signature.

SIMONI ANDERSEN.